Dec. 24, 1968  YO IKEBE ET AL  3,417,667
OIL PRESSURE TORQUE AMPLIFIER
Filed Nov. 7, 1966  3 Sheets-Sheet 1

FIG. 1

United States Patent Office 3,417,667
Patented Dec. 24, 1968

3,417,667
OIL PRESSURE TORQUE AMPLIFIER
Yo Ikebe and Jun Ikebe, Tokyo, and Seiuemon Inaba, Kawasaki-shi, Japan, assignors to Fujitsu Limited, Kawasaki, Japan, a corporation of Japan
Filed Nov. 7, 1966, Ser. No. 592,655
Claims priority, application Japan, Nov. 10, 1965,
40/91,167; 40/91,168; 40/91,169; 40/91,170; 40/91,171
9 Claims. (Cl. 91—375)

ABSTRACT OF THE DISCLOSURE

An input torque is applied to a rotatably mounted disc in a housing. A shaft coaxially mounted with the disc for rotation has an end area having an end surface in close proximity with the disc. A hydraulic motor is coupled to the shaft at its end opposite the end area. A pair of slots are formed in the end area of the shaft in spaced relation to each other, each being of substantially lunar configuration with varying radial width. A chamber is formed in the housing adjacent the disc. A pair of spaced windows formed in the disc and cooperating with the slots to provide variable openings from the slots to the chamber through the windows upon relative angular displacement of the disc and shaft. A pilot valve includes a piston member in a valve chamber. Fluid under pressure is supplied to and removed from the valve chamber. Conduits extend from the valve chamber, the slots and the hydraulic motor.

Description of the invention

The present invention relates to a torque amplifier. More particularly, the invention relates to an oil pressure torque amplifier.

The principal object of the present invention is to provide a new and improved oil pressure torque amplifier. The torque amplifier of the present invention amplifies the output torque of a small output control motor such as, for example, an electric pulse motor, by an oil pressure servo system. The torque amplifier of the present invention amplifies even an extremely small output torque of a small output control motor to a useful magnitude. The torque amplifier of the present invention amplifies the torque of a motor which is rotating at a high speed. The torque amplifier of the present invention amplifies the torque of a motor although such motor is rotating at a speed which transiently produces a deviation greater than the deviation permissible by the oil pressure servo system. The torque amplifier of the present invention has improved resolving power and reduced hysteresis loss. The torque amplifier of the present invention is efficient, effective and reliable in operation.

In accordance with the present invention, torque amplifier apparatus comprises an input for providing an input torque, a housing, a disc mounted for rotation about its axis in the housing and a coupling coupling the input to the disc. A shaft is coaxially mounted with the disc in the housing for rotation about its axis. The shaft has an end area having an end surface in close proximity with the disc. A hydraulic motor has an output rotary shaft coupled to the shaft at its end opposite the end area. A pair of slots are formed in the end area of the shaft in spaced relation to each other. Each slot of the pair of slots is of substantially lunar configuration with varying radial width. A chamber is formed in the housing adjacent the disc. A pair of spaced diametrically positioned windows are formed in the disc. The windows and the slots cooperate to provide variable openings from the slots to the chamber through the windows upon relative angular displacement of the disc and the shaft. A pilot valve in the housing comprises a valve chamber having a plurality of areas including a first end area, second and third intermediate areas and a fourth end area and a piston member mounted in the valve chamber for axial displacement therein. A fluid inlet formed in the housing supplies fluid under pressure to the valve chamber. A fluid outlet formed in the housing removes fluid from the valve chamber. Conduit means are formed in the housing and comprises conduit means extending from and opening into one of the slots of the pair of slots and one of the first and fourth end areas of the valve chamber, conduit means extending from and opening into the other of the slots of the pair of slots and the other of the first and fourth end areas of the valve chamber, conduit means extending from and opening into the hydraulic motor and one of the second and third intermediate areas of the valve chamber and conduit means extending from and opening into the hydraulic motor and the other of the second and third intermediate areas of the valve chamber.

The coupling includes a spring for absorbing a determined amount of input torque. A limiter on each of the discs and the end surface of the end area of the shaft cooperate to limit relative angular displacement of the disc and the shaft. Each of the slots of the pair of slots extends in one embodiment of the present invention, for just under substantially 180°. In another embodiment of the present invention, each of the slots of the pair of slots extends for substantially 360°. A vibrator cooperates with the conduit means for vibrating the piston member of the pilot valve to prevent locking thereof in the valve chamber.

In order that the present invention may be readily carried into effect, it will now be described with reference to the accompanying drawings, wherein:

FIG. 1 is a view, partly in section, of an embodiment of the oil pressure torque amplifier of the present invention;

Figure 2:
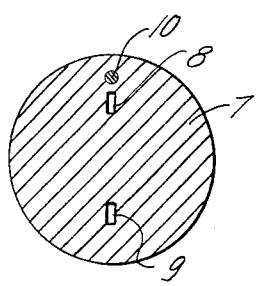
FIG. 2 is a view taken along the lines II—II of FIG. 1.

In FIG. 1, a control motor 1 of small output such as, for example, an electric pulse motor, produces an output torque which is transmitted via a gear 2, coupled to said motor, and a gear 3, to an input shaft 4, coupled to the gear 3. A spring 5 couples the input shaft 4 to an input shaft 6. The spring 5 is a helical spring.

Figure 3:
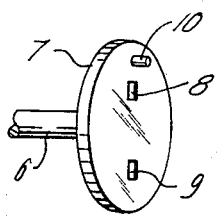
FIG. 3 is a perspective view of the disc 7 of FIG. 1.

A thin disc 7 is affixed to the end of the shaft 6 opposite the spring 5, and is shown in more detail in FIGS. 2 and 3. The disc 7, as shown in FIGS. 2 and 3, has an aperture or window 8 formed therethrough and an aperture or window 9 formed therethrough in spaced relation from the window 8 and diametrically opposite said window 8. A pin 10 extends or projects substantially perpendicularly from the disc 7. The pin 10 is positioned on the same diameter as the windows 8 and 9.

The disc 7 is urged against the end surface 11 of a shaft 12, which is positioned coaxially with the shaft 6, by a spring 13 and a member 14. The disc 7 is rotatable about its axis within a housing 15 and rotation of said disc is facilitated by a plurality of steel balls 16 which are positioned between and abut each of the member 14 and said disc. The steel balls 16 reduce friction. The end surface 11 of the shaft 12 and the corresponding abutting end surface of the disc 7 are each finished smoothly.

Figure 4:
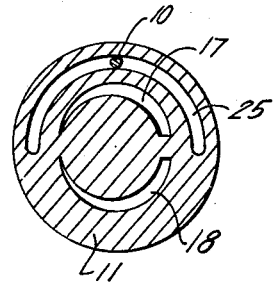
FIG. 4 is a view taken along the lines III—III of FIG. 1.

A pair of substantially semilunar slots, grooves or channels 17 and 18 are formed in the end surface 11 of the shaft 12. The slots 17 and 18 are symmetrical about a diameter between them and are spaced from each other and from said diameter. The slot 17 opens into an oil chamber 19 and the slot 18 opens into an oil chamber 20. The oil chambers 19 and 20 are formed in the shaft 12. As shown in FIG. 4, the slots 17 and 18 are each a configuration which provides a gradual variation in radial direction.

A circumferential groove 21 formed in the housing 15 opens into the oil chamber 19 via a conduit 22 formed in the shaft 12. A circumferential groove 23 formed in the housing 15 opens into the oil chamber 20 via a conduit 24 formed in the shaft 12. The oil chambers 19 and 20 are separate and independent from each other, and do not communicate with each other.

An arcuate or semicircular groove, slot or channel 25 is formed in the end surface 11 of the shaft 12, as shown in FIG. 4. The groove 25 extends for approximately 180°. The pin 10 of the disc 7 is inserted in the groove 25 with sufficient margin so that said pin is movable in said groove as a guide. The groove 25 and the pin 10 thus permit the disc 7 to rotate about 90° in each of a clockwise and counterclockwise direction about its axis.

An end 26 of the shaft 12 opposite the end surface 11 is coupled to the rotary shaft 27 of a rotary type hydraulic motor 28 via a coupling 29. A collar or ring 30 around the shaft 12 prevents movement of said shaft in an axial direction.

A conduit 31 opens into the circumferential groove 21 and a conduit 32 opens into the circumferential groove 23. The conduits 31 and 32 are formed in the housing 15. A reduction area 33 is provided in the conduit 31 and a reduction area 34 is provided in the conduit 32. The circumferential grooves 21 and 23 are downstream of the reduction areas 33 and 34, respectively. A circumferential groove 35 is formed in the housing 15 upstream of the reduction areas 33 and 34. The conduit 31 opens into a conduit 36, which opens into a conduit 37, which opens into a conduit 38, which opens into the circumferential groove 35. The conduit 32 opens into a conduit 39, which opens into the conduit 37, which opens into the conduit 38, which opens into the circumferential groove 35.

A cylindrical piston member, comprising a first piston 40, a second piston 41 and a third piston 42, coaxially positioned in spaced relation on a shaft 43 of considerably smaller diameter than said pistons, is positioned in a cylindrical valve chamber 44 formed in the housing 15. A first circumferential groove 45 is formed in the cylindrical chamber 44. The second circumferential groove 35 is formed in the cylindrical chamber 44 in spaced relation from the first circumferential groove 45. A third circumferential groove 46 is formed in the cylindrical chamber 44 in spaced relation from each of the first and second circumferential grooves 45 and 35.

The piston member 40, 41, 42 is mounted in the chamber 44 for movement in an axial direction, and said piston member, said chamber and the circumferential grooves 45, 35 and 46 together function as a four directional pilot valve. Fluid or oil under pressure provided by the four directional pilot valve produces rotation of the rotary shaft 27 of the hydraulic motor 28. A coaxially positioned helical spring 47 is provided between the first piston 40 and an end 48 of the chamber 44. A coaxially positioned helical spring 49 is provided between the third piston 42 and an end 50 of the chamber 44. The springs 47 and 49 hold the piston member 40, 41, 42 in its neutral position shown in FIG. 1.

An oil or fluid inlet 51 opens into the circumferential groove 35 via a conduit 52. A source of fluid or oil, not shown in the figures, supplies oil or fluid under pressure to the fluid inlet 51. An oil or fluid outlet 53 opens into the circumferential groove 45 via a conduit 54 and opens into the circumferential groove 46 via the conduit 54 and a conduit 55. The oil outlet 53 is fluid-connected to the fluid return inlet of the source of fluid or oil (not shown).

The cylindrical chamber 44 comprises a first or spring end area 56, a second or shaft area 57, a third or shaft area 58 and a fourth or spring end area 59. An oil or fluid inlet or outlet 60 of the hydraulic motor 28 opens into the second area 57 of the chamber 44 via a conduit 61. An oil or fluid inlet or outlet 62 of the hydraulic motor 28 opens into the third area 58 of the chamber 44 via a conduit 63. The conduit 31 opens into the first area 56 of the chamber 44 via a conduit 64. The conduit 32 opens into the fourth area 59 of the chamber 44 via a conduit 65.

A portion of the conduit 31 comprises elastic tubing 66 comprising, for example, rubber, and a circumferential groove 67 is formed around the outside of said elastic tubing. A portion of the conduit 32 comprises elastic tubing 68 comprising, for example, rubber, and a circumferential groove 69 is formed around the outside of said elastic tubing.

The elastic tubing 66 is provided between the reduction area 33 and the junction of the conduit 64 with the conduit 31. The elastic tubing 68 is provided between the reduction area 34 and the junction of the conduit 65 with the conduit 32. The circumferential groove 67 opens into a conduit 70 which comprises a reduction area 71, said circumferential groove being downstream of said reduction area. The circumferential groove 69 opens into a conduit 72 which comprises a reduction area 73, said circumferential groove being downstream of said reduction area. The reduction area 71 opens into a conduit 74, which opens into the conduit 38 upstream thereof. The reduction area 73 opens into a conduit 75, which also opens into the conduit 38 upstream thereof.

A nozzle 76 is provided at the end of a conduit 77 opening into a chamber 78 formed in the housing 15. The conduit 77 opens into the downstream part of the circumferential groove 67. A nozzle 79 is provided at the end of a conduit 80 opening into the chamber 78. The conduit 80 opens into the downstream part of the circumferential groove 69.

A pivotally mounted butterfly or flapper valve comprises a valve plate 81 pivotally mounted on a pin 82 affixed to the housing 15 and rotatable about said pin. The valve plate 81 is positioned adjacent the ends of the nozzles 76 and 79, and forms variable reduction areas in cooperation with said nozzle ends. The valve plate 81 thus forms a variable reduction area 83 with the nozzle opening of the nozzle 76 and said valve plate forms a variable reduction area 84 with the nozzle opening of the nozzle 79.

A spring 85 is affixed at one end to the housing 15 and at the other end to one end of the valve plate 81. An electromagnetically controlled rod 86 of an electromagnetic device 87 is positioned in operative abutting proximity with the end of the valve plate 81 to which the spring 85 is affixed. The electromagnetic device 87 is fixedly mounted in proximity with, or on, the housing 15. A conduit 88 extends from and opens into the chamber 78 and the conduit 54.

FIG. 1 illustrates the neutral condition of the torque amplifier of the present invention. In the neutral condition, the control motor 1 is stationary and the areas of the openings provided by the slots 17 and 18 of the end surface 11 of the shaft 12 and the windows 8 and 9 of the disc 7 are equal. Furthermore, the variable reduction areas 83 and 84 formed by the valve plate 81 and the nozzles 76 and 79 are equal.

When the torque amplifier is in its neutral condition, fluid or oil under pressure supplied to the oil inlet 51 flows through the reduction areas 33 and 34, thereby decreasing in pressure. The fluid also flows through the slots 17 and 18, thereby decreasing in pressure; the areas of the openings of said slots are equal. After flowing through the slots 17 and 18, the fluid is then released in an area of atmospheric pressure in the chamber 78. The fluid also flows through the reduction areas 71 and 73, thereby decreasing in pressure. The fluid then flows through the variable reduction areas 83 and 84, thereby further decreasing in pressure, the variable reduction areas 83 and 84 being equal to each other in the neutral condition of the torque amplifier, and the fluid is then released in the area of atmospheric pressure of the chamber 78.

If the control motor 1 is rotated through a determined angle, so that the shaft 6 is rotated through a determined angle in, for example, the direction of the arrow around said shaft in FIG. 1, the area of the opening formed by the slot 17 of the end surface 11 of the shaft 12 and the window 8 of the disc 7 increases. The area of the opening formed by the slot 18 of the end surface 11 of the shaft 12 and the window 9 of the disc 7 decreases, due to the angular displacement of said disc and said shaft caused by the rotation of said disc with the shaft 6. The fluid or oil under pressure in the conduit 31 between the reduction area 33 and the circumferential groove 21 connected to the slot 17 thereby decreases in pressure, whereas the fluid or oil in the conduit 32 between the reduction area 34 and the circumferential groove 23 connected to the slot 18 increases in pressure. The principle of pressure variation is equivalent to the principle of back-pressure variation in an ordinary nozzle and butterfly or flapper mechanism.

As a result of the oil pressure decrease in the conduit 31 and the oil pressure increase in the conduit 32, the pressure of the fluid or oil in the first spring end area 56 of the cylindrical chamber 44 of the four directional pilot valve decreases and the pressure of the fluid in the fourth spring end area 59 of said chamber of said valve increases. The piston member 40, 41, 42 is then subjected to a force in the direction of an arrow 89 and is displaced in the direction of said arrow to a position at which such force is balanced by the restoring force of the springs 47 and 49. This operation is equivalent to the ordinary method of operating a four directional pilot valve utilizing the back-pressure of the nozzle and butterfly or flapper mechanism.

When the piston member 40, 41, 42 is displaced in the direction of the arrow 89, the fluid under pressure supplied at the oil inlet 51 flows to the oil inlet 62 via the conduit 63 and causes rotation of the rotary shaft 27 of the hydraulic motor 28. The return fluid or oil released by the hydraulic motor 28 flows from the fluid or oil outlet 60 of said hydraulic motor to the fluid outlet 53 via the conduit 61. This principle of operation is the ordinary one of operating a hydraulic motor via a four directional pilot valve.

If the hydraulic motor 28 is of a structure which provides rotation of the rotary shaft 27 thereof in the direction of the arrow around said rotary shaft, the said rotary shaft rotates the shaft 12 in the same direction, as indicated by the arrow around the shaft in FIG. 1. The rotation of the shaft 12 in the direction of the arrow therearound eliminates the difference between the area of the opening formed by the slot 17 and the window 8 and the area of the opening formed by the slot 18 and the window 9, which difference in area was produced by the rotation of the disc 7. When the area of the opening formed by the slot 17 and the window 8 is equal to the area of the opening formed by the slot 18 and the window 9, the torque amplifier is returned to its neutral condition and the rotary shaft 27 of the hydraulic motor 28 becomes stationary.

The disc 7 is urged against the end surface 11 of the shaft 12 by the spring 13. It is evident, however, that the disc 7 is also subjected to a force from the fluid which flows through the slots 17 and 18 of the end surface 11. The force applied to the disc 7 by the fluid flowing through the slots 17 and 18 is in the opposite direction from the force applied to said disc by the spring 13. It is thus possible to eliminate fluid leakage and to decrease the contact pressure between the disc 7 and the end surface 11 of the shaft 12 by suitable selection of the force of the spring 13. The friction torque produced by the abutment of the disc 7 and the end surface 11 is then decreased and the torque required to rotate the shaft 6 is then very small. This enables the control motor 1 to have a very small output torque.

When the disc 7 is rotated continuously at a constant rate by the control motor 1, the torque amplifier of the present invention functions to rotate the rotary shaft 27 of the hydraulic motor 28 continuously at a constant rate in the same direction as said disc. During the rotation of the disc 7, the shaft 12 rotates continuously at a constant rate in the direction of said disc. The shaft 12 and the disc 7, are, however, displaced by a determined angle from each other, as aforedescribed. The disc 7 and the shaft 12 are in non-displaced alignment only when the torque amplifier is in its neutral condition. The angle of displacement of the disc 7 and the shaft 12 corresponds to the constant deviation in a servo system or servomechanism. The greater the input speed of the servomechanism, that is, the greater the increase in input speed of the servo system, the greater the increase of the speed of rotation of the disc 7 and the greater the increase of the constant deviation.

Figure 5:
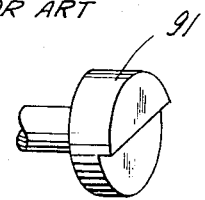
FIG. 5 is a perspective view of a known type of disc of the prior art corresponding to the disc 7 of FIG. 1.
Figure 6:
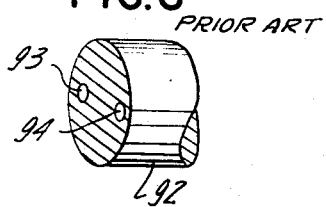
FIG. 6 is a perspective view of the end portion of a known type of shaft of the prior art corresponding to the shaft 12 of FIG. 1.

FIGS. 5 and 6 disclose a disc and a shaft of the prior art corresponding to the disc 7 and the shaft 12, respectively, of FIG. 1. In FIG. 5, the disc 91 is a type utilized in the prior art and corresponds to the disc 7. It is essentially of circular cross-section for about half of its thickness and is then stepped substantially perpendicularly in directions parallel to axial direction, so that the remaining half of its thickness on the surface opposite that of the shaft to which it is affixed is of semicircular cross-section. The shaft 92 of FIG. 6 is of a type of the prior art and corresponds to the shaft 12. The shaft 29 has an end surface corresponding to the end surface 11 of the shaft 12 of FIG. 1, having an aperture or hole 93 and an aperture or hole 94 formed therein in spaced diametric relation. The aperture 93 corresponds to the slot 17 and the aperture 94 corresponds to the slot 18 of the end surface 11 of FIG. 1. When the apparatus is in its neutral condition, the extending semicircular portion of the disc 11 is in abutment with the end surface of the shaft 92 and covers half of each of the apertures 93 and 94.

The apparatus of the present invention is able to provide a constant deviation, as aforedescribed, which is greater than that provided by apparatus of the prior art. This is due to the new and improved apparatus for controlling the difference between the area of opening of each of the slots 17 and 18 in the aforedescribed manner. More particularly, the extension of each of the slots 17 and 18 for approximately 180°, the variation of the radial width of each of said slots and the provision of the windows 8 and 9 in the disc 7 cooperate to enable the torque amplifier of the present invention to provide a constant deviation which is larger than the deviation provided by apparatus of the prior art. The speed of rotation of the disc 7 may be made extremely high in the torque amplifier apparatus of the present invention.

Figure 7:
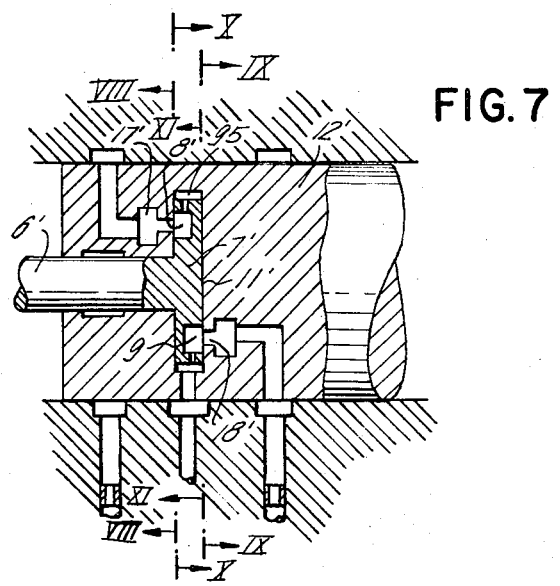
FIG. 7 is a view, partly in section, of a modification of the embodiment of FIG. 1.

The modification of FIG. 7 functions to provide a constant deviation which is even greater than that provided by the embodiment of FIG. 1. In FIG. 7, the disc 7', the shaft 12', the end surface 11' of the shaft 12', the window 8', the window 9', the slot, groove or channel 17' and the slot, groove or channel 18' are substantially the same as the disc 7, the shaft 12, the end surface 11 of the shaft 12, the window 8, the window 9, the slot 17 and the slot 18, of the embodiment of FIG. 1. The slots 17' and 18' of the end surface 11' of the shaft 12', however, extend for approximately 360°, rather than 180° as do the slots 17 and 18.

Figure 8:
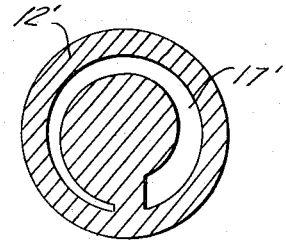
FIG. 8 is a view taken along the lines VIII—VIII of FIG. 7.
Figure 9:
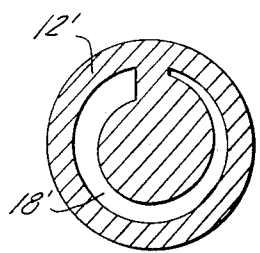
FIG. 9 is a view taken along the lines IX—IX of FIG. 7.

As seen in FIGS. 8 and 9, each of the slots 17' and 18' varies in radial width for almost 360°. Each of the grooves 17' and 18' is of substantially lunar configuration, similar to the grooves 17 and 18.

Figure 10:
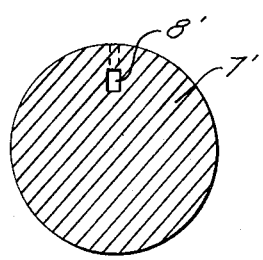
FIG. 10 is a view taken along the lines X—X of FIG. 7.
Figure 11:
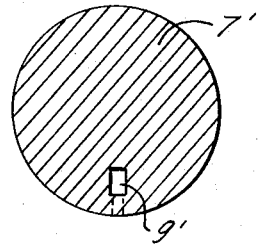
FIG. 11 is a view taken along the lines XI—XI of FIG. 7.

The windows 8' and 9', as shown in FIGS. 10 and 11, respectively, are essentially similar to and similarly positioned with the windows 8 and 9 of the embodiment of FIG. 1, with the exception that each of the windows 8' and 9' has greater dimensions than the similar windows 8 and 9. The greater dimensions of each of the windows 8 and 9 are necessitated by the greater dimensions of each of the grooves 17' and 18'.

In the modification of FIG. 7, although the windows 8' and 9' are formed in the disc 7', they do not extend through the disc relative to its thickness, as do the windows 8 and 9 of FIG. 1. That is, each of the windows 8' and 9' extends for a determined depth into the disc 7'; the window 8' being formed in the surface of the disc adjacent the shaft 6' and the window 9' being formed in the surface of the disc opposite that adjacent said shaft. Each of the windows 8' and 9' then opens into a circumferential groove 95 which is formed around the peripheral surface of the disc 7'.

Each of the windows 8' and 9' opens into the peripheral groove 95 via a radially extending conduit formed in the disc 7' and extending from and opening into each of the corresponding window and the circumferential groove. Furthermore, the groove 17' does not open on the end surface 11' of the shaft 12', but opens on a surface of said shaft which abuts the surface of the disc 7' adjacent the shaft 6'. It is thus seen that one groove and one corresponding window appear at one surface of the disc 7' and the other groove and corresponding window appear at the other or opposite surface of said disc in the modification of FIG. 7, whereas in the embodiment of FIG. 1 both grooves cooperate with the corresponding windows at the same surface of the disc 7.

In an oil pressure torque amplifier of the type of the present invention, the angle of relative displacement of the disc 7 and the shaft 12 is limited. More particularly, in order for the torque amplifier to function as desired, the angle of relative displacement of the disc 7 and the shaft 12 is limited to approximately 90° in the embodiment of FIG. 1, and the angle of relative displacement of the disc 7' and the shaft 12' is limited to approximately 180° in the modification of FIG. 7. In the embodiment of FIG. 1, the pin 10 extending from the disc 7 and the semicircular groove 25 formed in the end surface 11 of the shaft 12 function to prevent the angular displacement of the disc and the shaft from exceeding the 90° limit.

It may be assumed that the disc 7 of FIG. 1 is abruptly and suddenly rotated at a specific speed from a stationary condition. It may also be assumed that in the normal condition, the angle of relative displacement of the disc 7 and the shaft 12, that is, the constant deviation, is a little less than the angular limit of displacement, which is almost 90° in the embodiment of FIG. 1 and almost 180° in the modification of FIG. 7. When the disc 7 is suddenly rotated, in the aforementioned manner, in the transient condition, the angle of relative displacement of said disc and the shaft 12 may exceed the angular limit. If a helical spring 5, as shown in FIG. 1, is affixed to and couples the shaft 4 and the shaft 6, as also shown in FIG. 1, then, in the transient condition, the disc 7 is angularly displaced from the shaft 12 by the angular limit and is held at such limit and only the shaft 4 continues to rotate. The continued rotation of the shaft 4 twists or winds up the spring 5 and the transient condition is soon terminated and normal continuous rotation at a constant rate occurs.

It is thus seen that the spring 5 permits an abrupt or sudden rotational speed exceeding the angular limitation of relative displacement of the disc 7 and the shaft 12 in the transient condition but not exceeding such angular limit in the normal condition.

In an oil pressure torque amplifier similar to that of the present invention, locking or binding of the piston member 40, 41, 42 due to fluid or oil pressure or dust or foreign matter in such fluid or oil, causes a decrease in the resolving power or an increase in the hysteresis losses of the apparatus. An effective method of eliminating such locking or binding of the piston member 40, 41, 42 is to constantly vibrate it minutely at a comparatively high frequency.

Figure 12:
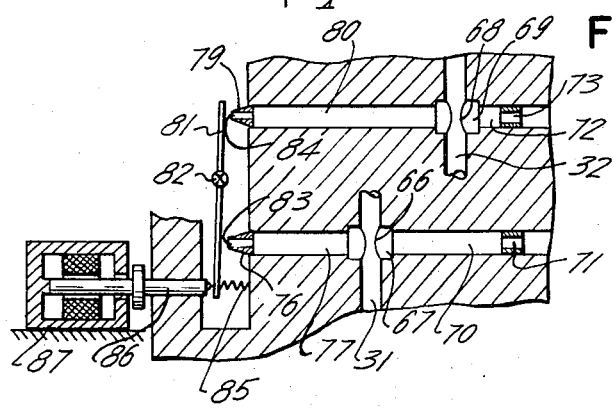
FIG. 12 is a view, partly in section, of the butterfly valve part of the oil pressure torque amplifier of FIG. 1 in one condition of operation.
Figure 13:
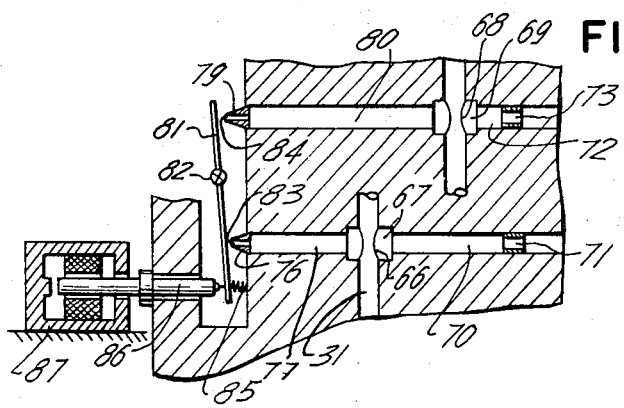
FIG. 13 is a view, partly in section, of the butterfly valve part of the oil pressure torque amplifier of FIG. 1 in another condition of operation.

If an electric current is interruptedly supplied by a relatively high frequency to the coil of the electromagnetic device 87 of FIG. 1, the butterfly or flapper valve plate 81 rotates about its pivot pin 82. The rotation or pivoting of the valve plate 81 about the pin 82 alternately increases and decreases the variable reduction areas 83 and 84 formed by said valve plate and the nozzles 76 and 79. FIGS. 12 and 13 illustrate different conditions of the valve plate 81 relative to the nozzles 76 and 79.

In FIG. 12, an electric current is supplied to the coil of the electromagnetic device 87, so that the rod 86 controlled by the magnetic field of said device is attracted to said device and permits the spring 85 to urge the valve plate 81 in a clockwise direction about the pivot pin 82. The valve plate 81 then almost closes the nozzle 79, and leaves the nozzle 76 at its maximum opening.

In FIG. 13, the supply of electric current to the electromagnetic device 87 is cut off, so that the rod 86 is repelled by the magnetic field of said device toward the housing 15. The rod 86 thus urges the valve plate 81 to rotate about the pivot pin 82 in a counterclockwise direction against the force of the spring 85. In this condition, the valve plate 81 almost closes the opening of the nozzle 76, but permits the maximum opening of the nozzle 79.

In the condition illustrated in FIG. 12, the pressure of the oil or fluid in the circumferential groove 69 becomes almost equal to the pressure of the fluid supplied to the torque amplifier via the oil inlet 51. This near equalization of pressure causes the elastic tubing 68 to be compressed from the directions of the circumferential groove 69. This produces an additional reduction in area in the conduit 32, and the pressure of the conduit and the chamber between the elastic tubing 68 and the groove 18 in the conduit 32 is decreased and the pressure of the fluid in the fourth spring end area 59 of the chamber 44 is decreased.

In the condition illustrated in FIG. 13, the pressure of the fluid in the first spring end area 56 is decreased by the equivalent operation. Thus, if the condition of FIG. 12 and the condition of FIG. 13 are alternated, the pressure of the fluid or oil in the first and fourth end areas 56 and 59 of the chamber 43 are alternately decreased. The alternate decrease of fluid pressure in the first and fourth end areas 56 and 59 provides alternately directed axial forces on the piston member 40, 41, 42. In other words, the interrupted supply of electric current to the electromagnetic device 87 vibrates the piston member 40, 41, 42 and prevents it from locking or binding in the chamber 44. A suitable frequency and amplitude of vibration of the piston member 40, 41, 42 is provided by selection of the frequency of interruption of the electric current supplied to the electromagnetic device 87 and by selection of the elasticity or rigidity characteristics of the elastic tubing 66 and 68.

We claim:
1. Torque amplifier apparatus comprising
input means for providing an input torque;
housing means;
a disc mounted for rotation about its axis in said housing means;
coupling means coupling said input means to said disc, said coupling means including spring means for absorbing a determined part of said input torque;
a shaft coaxially mounted with said disc in said housing means for rotation about its axis, said shaft having an end area having an end surface in close proximity with said disc;
a hydraulic motor having an output rotary shaft coupled to said shaft at its end opposite said end area;
a pair of slots formed in the end area of said shaft in spaced relation to each other each of substantially lunar configuration with varying radial width;
a chamber formed in said housing means adjacent said disc;
a pair of spaced windows formed in said disc, said windows and said slots cooperating to provide variable openings from said slots to said chamber through said windows upon relative angular displacement of said disc and said shaft;
pilot valve means in said housing means, said pilot valve means comprising a valve chamber having a plurality of areas including a first end area, second and third intermediate areas and a fourth end area and a piston member mounted in said valve chamber for axial displacement therein;
fluid inlet means formed in said housing means for supplying fluid under pressure to said valve chamber;
fluid outlet means formed in said housing means for removing fluid from said valve chamber; and
conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber.

2. Torque amplifier apparatus as claimed in claim 1, wherein said spring means comprises helical spring means having one end coupled to said input means and its other end coupled to said disc.

3. Torque amplifier apparatus as claimed in claim 2, further comprising limit means on each of said disc and the end surface of the end area of said shaft cooperating to limit relative angular displacement of said disc and said shaft, and vibrating means cooperating with said conduit means for vibrating the piston member of said pivot valve means to prevent locking thereof in said valve chamber.

4. Torque amplifier apparatus, comprising
input means for providing an input torque;
housing means;
a disc mounted for rotation about its axis in said housing means;
coupling means coupling said input means to said disc;
a shaft coaxially mounted with said disc in said housing means for rotation about its axis, said shaft having an end area having an end surface in close proximity with said disc;
a hydraulic motor having an output rotary shaft coupled to said shaft at its end opposite said end area;
a pair of slots formed in the end area of said shaft in spaced relation to each other each of substatnially lunar configuration with varying radial width;
a chamber formed in said housing means adjacent said disc;
a pair of spaced windows formed in said disc, said windows and said slots cooperating to provide variable openings from said slots to said chamber through said windows upon relative angular displacement of said disc and said shaft;
limit means on each of said disc and the end surface of the end area of said shaft cooperating to limit relative angular displacement of said disc and said shaft;
pilot valve means in said housing means, said pilot valve means comprising a valve chamber having a plurality of areas including a first end area, second and third intermediate areas and a fourth end area and a piston member mounted in said valve chamber for axial displacement therein;
fluid inlet means formed in said housing means for supplying fluid under pressure to said valve chamber;
fluid outlet means formed in said housing means for removing fluid from said valve chamber; and
conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber.

5. Torque amplifier apparatus, comprising
input means for providing an input torque;
housing means;
a disc mounted for rotation about its axis in said housing means;
coupling means coupling said input means to said disc;
a shaft coaxially mounted with said disc in said housing means for rotation about its axis, said shaft having an end area having an end surface in close proximity with said disc;
a hydraulic motor having an output rotary shaft coupled to said shaft at its end opposite said end area;
a pair of slots formed in the end area of said shaft in spaced relation to each other each of substantially lunar configuration with varying radial width, each of said slots extending for just under substantially 180°;
a chamber formed in said housing means adjacent said disc;
a pair of spaced windows formed in said disc, said windows and said slots cooperating to provide variable openings from said slots to said chamber through said windows upon relative angular displacement of said disc and said shaft;
pilot valve means in said housing means, said pilot valve means comprising a valve chamber having a plurality of areas including a first end area, second and third intermediate areas and a fourth end area and a piston member mounted in said valve chamber for axial displacement therein;
fluid inlet means formed in said housing means for supplying fluid under pressure to said valve chamber;
fluid outlet means formed in said housing means for removing fluid from said valve chamber; and conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber.

6. Torque amplifier apparatus, comprising
input means for providing an input torque;
housing means;
a disc mounted for rotation about its axis in said housing means;
coupling means coupling said input means to said disc;
a shaft coaxially mounted with said disc in said housing means for rotation about its axis, said shaft having an end area having an end surface in close proximity with said disc;
a hydraulic motor having an output rotary shaft coupled to said shaft at its end opposite said end area;
a pair of slots formed in the end area of said shaft in spaced relation to each other each of substantially lunar configuration with varying radial width, each of said slots extending for substantially 360°;
a chamber formed in said housing means adjacent said disc;
a pair of spaced windows formed in said disc, said windows and said slots cooperating to provide variable openings from said slots to said chamber through said windows upon relative angular displacement of said disc and said shaft;
pilot valve means in said housing means, said pilot valve means comprising a valve chamber having a plurality of areas including a first end area, second and third intermediate areas and a fourth end area and a piston member mounted in said valve chamber for axial displacement therein;
fluid inlet means formed in said housing means for supplying fluid under pressure to said valve chamber;
fluid outlet means formed in said housing means for removing fluid from said valve chamber; and
conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber.

7. Torque amplifier apparatus, comprising
input means for providing an input torque;
housing means;
a disc mounted for rotation about its axis in said housing means;
coupling means coupling said input means to said disc;
a shaft coaxially mounted with said disc in said housing means for rotation about its axis, said shaft having an end area having an end surface in close proximity with said disc;
a hydraulic motor having an output rotary shaft coupled to said shaft at its end opposite said end area;
a pair of slots formed in the end area of said shaft in spaced relation to each other each of substantially lunar configuration with varying radial width;
a chamber formed in said housing means adjacent said disc;
a pair of spaced windows formed in said disc, said windows and said slots cooperating to provide variable openings from said slots to said chamber through said windows upon relative angular displacement of said disc and said shaft;
pilot valve means in said housing means, said pilot valve means comprising a valve chamber having a plurality of areas including a first end area, second and third intermediate areas and a fourth end area and a piston member mounted in said valve chamber for axial displacement therein;
fluid inlet means formed in said housing means for supplying fluid under pressure to said valve chamber;
fluid outlet means formed in said housing means for removing fluid from said valve chamber;
conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber; and
vibrating means cooperating with said conduit means for vibrating the piston member of said pilot valve means to prevent locking thereof in said valve chamber.

8. Torque amplifier apparatus, comprising
input means for providing an input torque, said input means comprising an electric pulse motor;
housing means;
a disc mounted for rotation about its axis in said housing means;
coupling means coupling said input means to said disc;
a shaft coaxially mounted with said disc in said housing means for rotation about its axis, said shaft having an end area having an end surface in close proximity with said disc;
a hydraulic motor having an output rotary shaft coupled to said shaft at its end opposite said end area;
a pair of slots formed in the end area of said shaft in spaced relation to each other each of substantially lunar configuration with varying radial width;
a chamber formed in said housing means adjacent said disc;
a pair of spaced windows formed in said disc, said windows and said slots cooperating to provide variable openings from said slots to said chamber through said windows upon relative angular displacement of said disc and said shaft;
pilot valve means in said housing means, said pilot valve means comprising a valve chamber having a plurality of areas including a first end area, second and third intermediate areas and a fourth end area and a piston member mounted in said valve chamber for axial displacement therein;
fluid inlet means formed in said housing means for supplying fluid under pressure to said valve chamber;
fluid outlet means formed in said housing means for removing fluid from said valve chamber; and
conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber.

9. Torque amplifier apparatus, comprising input means for providing an input torque;

housing means;

a disc mounted for rotation about its axis in said housing means;

coupling means coupling said input means to said disc;

a shaft coaxially mounted with said disc in said housing means for rotation about its axis, said shaft having an end area having an end surface in close proximity with said disc;

a hydraulic motor having an output rotary shaft coupled to said shaft at its end opposite said end area;

a pair of slots formed in the end area of said shaft in spaced relation to each other each of substantially lunar configuration with varying radial width;

a chamber formed in said housing means adjacent said disc;

a pair of spaced windows formed in said disc, said windows and said slots cooperating to provide variable openings from said slots to said chamber through said windows upon relative angular displacement of said disc and said shaft, the windows of said pair of windows being diametrically positioned;

pilot valve means in said housing means, said pilot valve means comprising a valve chamber having a plurality of areas including a first end area, second and third intermediate areas and a fourth end area and a piston member mounted in said valve chamber for axial displacement therein;

fluid inlet means formed in said housing means for supplying fluid under pressure to said valve chamber;

fluid outlet means formed in said housing means for removing fluid from said valve chamber; and conduit means formed in said housing means, said conduit means comprising conduit means extending from and opening into one of said pair of slots and one of the first and fourth end areas of said valve chamber, conduit means extending from and opening into the other of said pair of slots and the other of said first and fourth end areas of said valve chamber, conduit means extending from and opening into said hydraulic motor and one of said second and third intermediate areas of said valve chamber and conduit means extending from and opening into said hydraulic motor and the other of said second and third intermediate areas of said valve chamber.

References Cited

UNITED STATES PATENTS

| | | | |
|---|---|---|---|
| 2,228,022 | 1/1941 | Ziebolz | 91—375 |
| 3,079,899 | 3/1963 | Inoba et al. | 91—375 |
| 3,176,593 | 4/1965 | Bernstein | 91—51 |

FOREIGN PATENTS

| | | |
|---|---|---|
| 500,840 | 2/1939 | Great Britain. |
| 927,355 | 5/1963 | Great Britain. |

PAUL E. MASLOUSKY, *Primary Examiner.*

U.S. Cl. X.R.

91—376, 459, 461